United States Patent
Killinger et al.

(10) Patent No.: US 7,220,086 B2
(45) Date of Patent: May 22, 2007

(54) TOOL HEAD WITH AT LEAST TWO INDEXABLE CUTTING INSERTS

(75) Inventors: Bernd Killinger, Inverness, IL (US); Mike Bodin, Loveland, OH (US)

(73) Assignee: Komet Group Holding GmbH (DE)

( * ) Notice: Subject to any disclaimer, the term of this patent is extended or adjusted under 35 U.S.C. 154(b) by 206 days.

(21) Appl. No.: 10/623,949

(22) Filed: Jul. 21, 2003

(65) Prior Publication Data

US 2004/0018065 A1 Jan. 29, 2004

(30) Foreign Application Priority Data

Jul. 26, 2002 (DE) ................................ 102 34 346

(51) Int. Cl.
*B23B 41/12* (2006.01)
*B23B 29/03* (2006.01)

(52) U.S. Cl. ..................... 408/83.5; 408/188; 408/223; 408/713; 407/113

(58) Field of Classification Search ............... 408/83.5, 408/187, 188, 189, 223, 224, 713; 407/113, 407/78

See application file for complete search history.

(56) References Cited

U.S. PATENT DOCUMENTS

| | | | | |
|---|---|---|---|---|
| 1,442,804 A | * | 1/1923 | Hicks ........................ | 408/83.5 |
| 1,572,752 A | * | 2/1926 | North ........................ | 408/83.5 |
| 3,728,940 A | * | 4/1973 | Peterson .................... | 408/83.5 |
| 3,999,452 A | * | 12/1976 | Larsen ........................ | 82/113 |
| 4,210,406 A | * | 7/1980 | Berry, Jr. ................... | 408/223 |
| 4,288,179 A | * | 9/1981 | Kruger et al. .............. | 407/114 |
| 4,591,303 A | * | 5/1986 | Sato et al. .................. | 408/206 |
| 4,975,002 A | * | 12/1990 | Kress et al. ................ | 408/224 |
| 5,609,446 A | * | 3/1997 | Link et al. .................. | 408/224 |
| 5,620,284 A | * | 4/1997 | Ueda et al. ................. | 408/158 |
| 5,791,838 A | * | 8/1998 | Hamilton .................... | 408/224 |
| 5,839,859 A | * | 11/1998 | Shimomura et al. ........ | 408/158 |
| 5,876,155 A | * | 3/1999 | Link et al. .................. | 408/1 R |
| 5,890,850 A | * | 4/1999 | Hulsebus et al. ........... | 408/1 R |
| 5,967,007 A | * | 10/1999 | Scheer ........................ | 82/1.5 |
| 6,164,878 A | * | 12/2000 | Satran et al. ............... | 407/113 |
| 6,234,724 B1 | * | 5/2001 | Satran et al. ............... | 407/43 |
| 6,325,575 B1 | * | 12/2001 | Pawlik ....................... | 408/83.5 |
| 6,739,807 B2 | * | 5/2004 | Robinson et al. ........... | 407/50 |
| 6,796,750 B2 | * | 9/2004 | Men ............................ | 407/35 |

* cited by examiner

*Primary Examiner*—Monica Carter
*Assistant Examiner*—Michael W. Talbot
(74) *Attorney, Agent, or Firm*—Akerman Senterfitt

(57) ABSTRACT

The invention concerns a tool head for employment in machine tools with multiple indexable cutting inserts (20, 20', 20"). The tool head includes a base body (12), a tool shank (14) projecting axially beyond the base body (12) and at least two blade receptacles (18, 18', 18") which are spaced apart at least in the circumferential direction for receiving respectively one indexable cutting insert. The active main cutting edge of the different indexable cutting inserts therein have a differing adjustment angle ($\alpha$, $\alpha'$, $\alpha''$) relative to the axis of the base body. In order to reduce the blade costs, the same type of indexable cutting insert (20, 20', 20") is provided in the different blade receptacles. Besides this, the active main cutting edges (34) of the indexable cutting inserts are subdivided along their length into at least two blade segments (36, 36', 36") in alignment with each other, wherein for the indexable cutting inserts in the various blade receptacles (18, 18', 18") respectively only one of the cutting segments (36, 36', 36") is effective with the associated adjustment ($\alpha$, $\alpha'$, $\alpha''$).

12 Claims, 5 Drawing Sheets

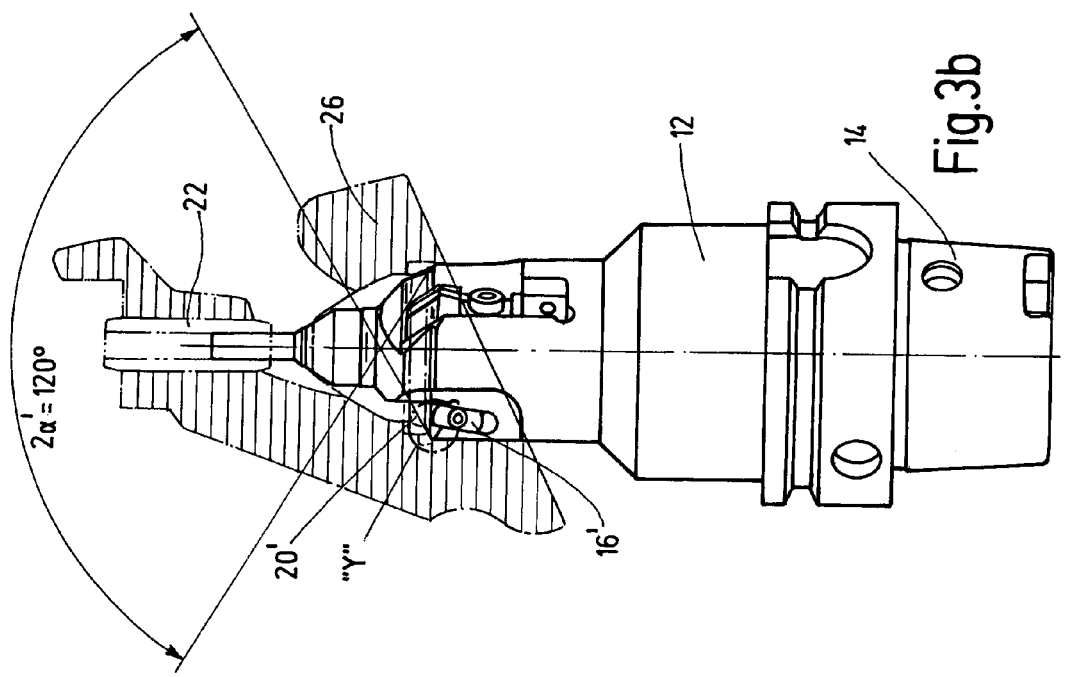
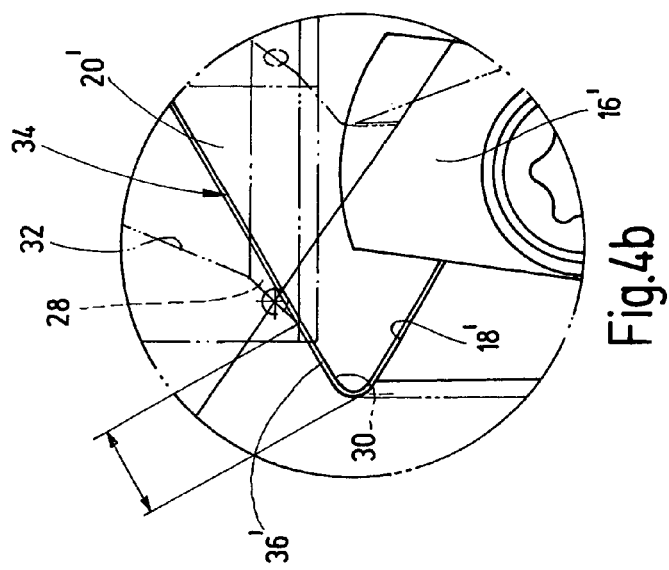

TOOL HEAD WITH AT LEAST TWO INDEXABLE CUTTING INSERTS

BACKGROUND OF THE INVENTION

1. Field of the Invention

The invention concerns a tool head for use in a machine tool, the machine tool having base body, a tool shank adapted to be coupled to a rotating machine spindle projecting axially beyond the base body and two cutting insert receptacles spaced apart in the circumferential and/or in the axial direction for receiving respectively one indexable cutting insert, of which the active main cutting surfaces exhibit deferring adjustment angles relative to the axis of the base body.

2. Description of the Related Art

In known machine tools of this type (DE-A-196 05 156), which are designed for finishing valve seat rings and tappet guide bores in cylinder heads, three cutting inserts are provided arranged distributed about the circumference of the base body, wherein one is provided for producing the tight seat bevel for the valve and the other two are provided for producing an inlet and an and outlet protective bevel. The tight seat bevel is associated with a high precision requirement. For producing the three beveled areas, until now three different cutting inserts were employed, which are secured to the tool head by clamping in different positions and orientations. Each of these cutting inserts has a predetermined bevel angle for the associated purpose. In the case of wear then, during tool change-out, care must be taken to ensure that on the appropriate insert receptacle respectively the correct type of replacement insert is introduced. Disadvantages associated therewith include the difficulty of manipulation during change-out of cutting inserts and the high cost of cutting inserts.

SUMMARY OF THE INVENTION

Beginning therewith, it is the task of the present invention to improve the conventional tool head in such a manner, that the cutting insert costs, which result from wear and changing out, can be reduced, that the manipulation during changing out of the cutting inserts is simplified and that nevertheless a high processing precision is achieved.

The solution of this task is proposed in accordance with the combination of characteristics set forth in patent claim 1. Advantageous embodiments and further developments of the invention can be seen from the dependent claims.

The inventive solution is based primarily on the idea, that in the different insert receptacles the same type of indexable cutting insert is provided and that the active main blades of the indexable cutting insert is lengthwise sub-divided into at least two cutting segments aligned with each other, wherein in the indexable cutting inserts in the different insert receptacles respectively only one of the blade segments is effective with it's associated adjustment angle. By this means it is achieved, that the indexable cutting insert during the work process is worn only in the utilized cutting work blade segment such that it can be shifted or reset within the work tool between the different insert receptacles following a predetermined resetting plan or schedule, until all cutting blade segments are worn. Since the indexable cutting inserts can exhibit a multi-corner circumference with multiple cutting edges, the relocation process between the insert receptacles can be repeated for each individual main blade. Thereby there results a substantial reduction in the cost of cutting inserts, which is a function of wear and changing out.

It is envisioned in a preferred embodiment of the invention that the effective blade segments of the indexable cutting inserts in the various blade receptacles exhibit an axial separation from each other. Thereby it is accomplished that one workpiece is finish-processed simultaneously in three different locations, for example, is provided with a bevel.

The blade receptacles are preferably provided on preferably adjustable short clamp-holders for indexable cutting inserts, which are rigidly connected with the base body.

In order to be able to carry out with the work tool head simultaneously a finished processing of valve seat bevels and a tappet guide bore there is further provided, in accordance with a further development of the invention, a reamer located centrally and projecting in the direction of advance beyond the area of the indexable cutting inserts, which in certain cases is displaceable axially relative to the base body.

It is important for planning or scheduling the resetting, that the indexable cutting inserts in the areas of their main cutting blades bear an imprint marking the individual cutting segments. The imprints are preferably so selected, that the association with the individual insert receptacles is easily recognizable.

BRIEF DESCRIPTION OF THE DRAWINGS

In the following the invention will be discussed in greater detail on the basis of the illustrative embodiments represented in schematic manner in the figure. There is shown FIG. 1 a perspective representation of a valve seat—tool head;

FIGS. 3a–c three views of the tool head in the direction of the arrows "A", "B" and "C" of FIG. 2;

FIGS. 4a–c detailed segments X, Y and Z from FIG. 3a through c;

DETAILED DESCRIPTION OF THE INVENTION

Figure 1:
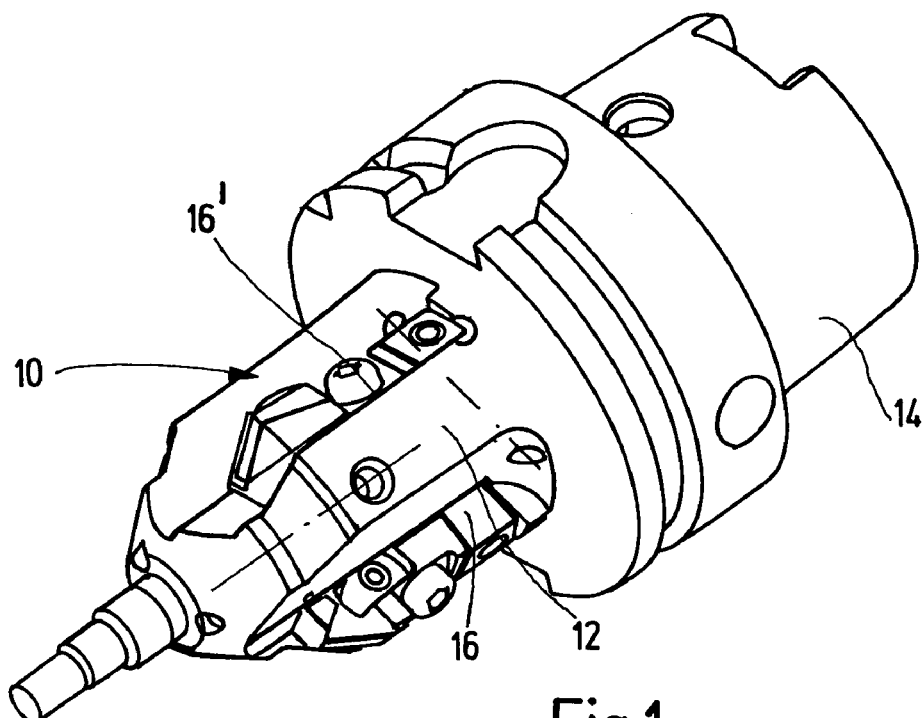
Figure 2:
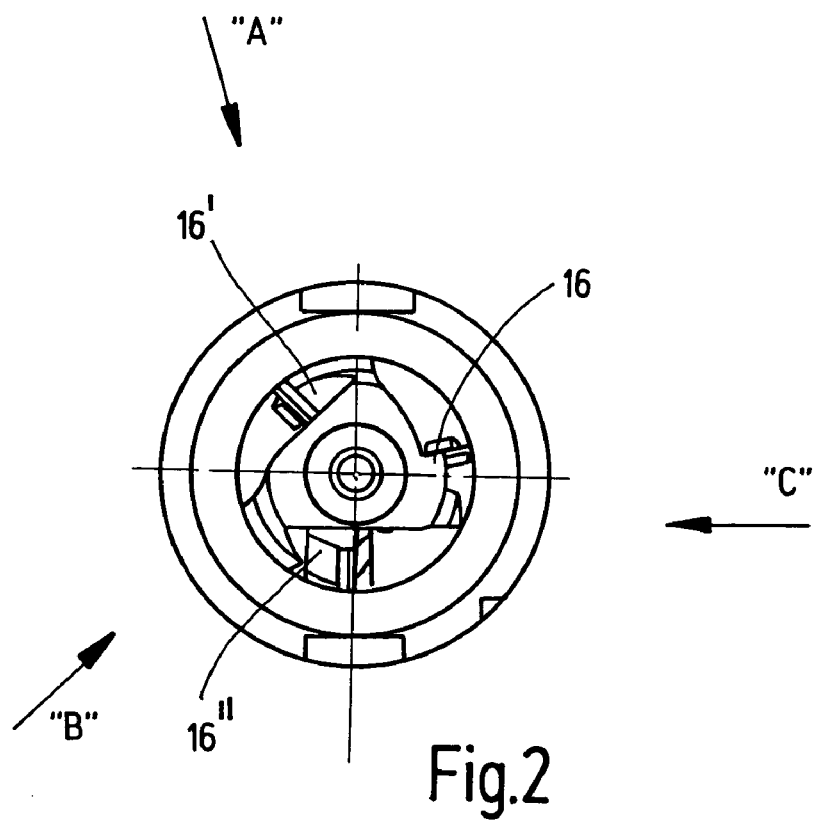
FIG. 2 a top view upon the tool head of FIG. 1.
Figure 3A:
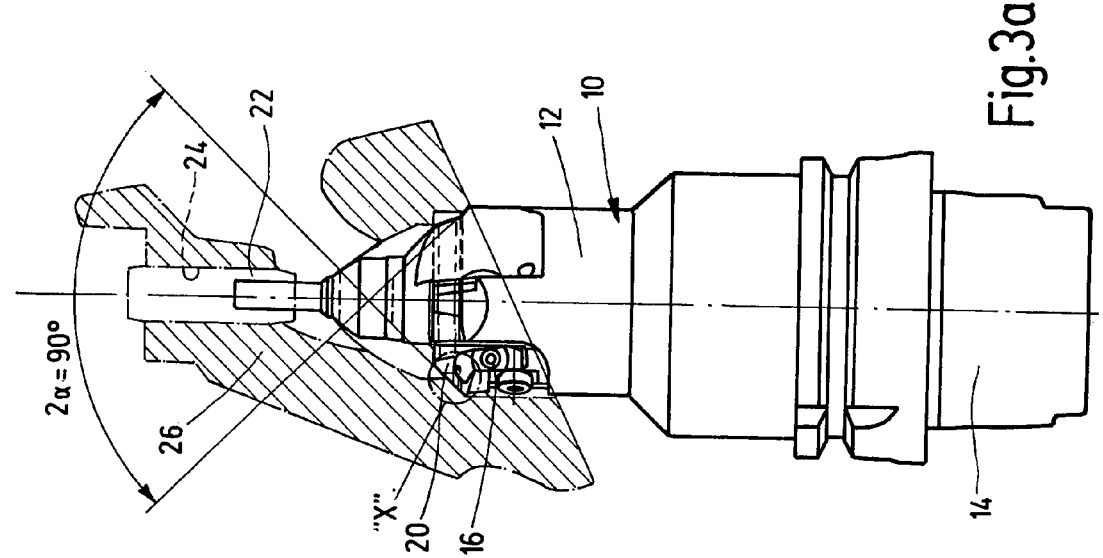

The tool head shown in the figure is designed for finish-processing of valve seat rings and tappet guide bores in cylinder heads for internal combustion engines. The tool head 10 is comprised essentially of a base body 12, a tool shank 14 projecting axially beyond the base body 12 and couplable with a not shown, motor driveable, rotating machine spindle of a machine tool, three short clamp holders 16, 16', 16" provided spaced apart from each other about the circumference of the base body 12, which respectively exhibit one insert receptacle 18, 18', 18" for receiving an indexable cutting insert 20, 20', 20" and having a centrally located reamer 22 projecting beyond the surface. The reamer 22 is designed for processing a tappet guide bore 24 indicated in FIGS. 3a, b and c with a dash-and-dot line for a cylinder head 26 of which a segment is indicated with diagonal line shading. For face milling the valve seat ring 28 of the cylinder head 26 there is used the indexable cutting insert 20 provided in blade receptacle 18 of the short clamp holder 16. The two further indexable cutting inserts 20' and 20" are for production of the inlet protecting bevel 30 and the outlet protecting bevel 32 bordering the valve seat 28. The reaming of the tappet guide bore 24 and the fine machining of the valve seat ring 28 and the protective bevels 30, 32 occurs for reasons of centering precision in the one and the same machining step of the workpiece 10. Accordingly, the indexable cutting inserts 20, 20' 20" exhibit various adjustment angles in the associated blade receptacles 18, 18' 18" on their active blade edges 34 in conformance to the individual angles to be machined.

A feature of the invention is comprised therein, that three indexable cutting inserts 20, 20', 20" of the same type are employed. The indexable cutting inserts shown in FIGS. 1 through 4 exhibit a triangular circumference with an active main blade edge 34 and two passive main blade edges 34', 34". By unclamping and rotating by 120° all main blades 34, 34', 34" can be sequentially brought into the active position.

Figure 4A:
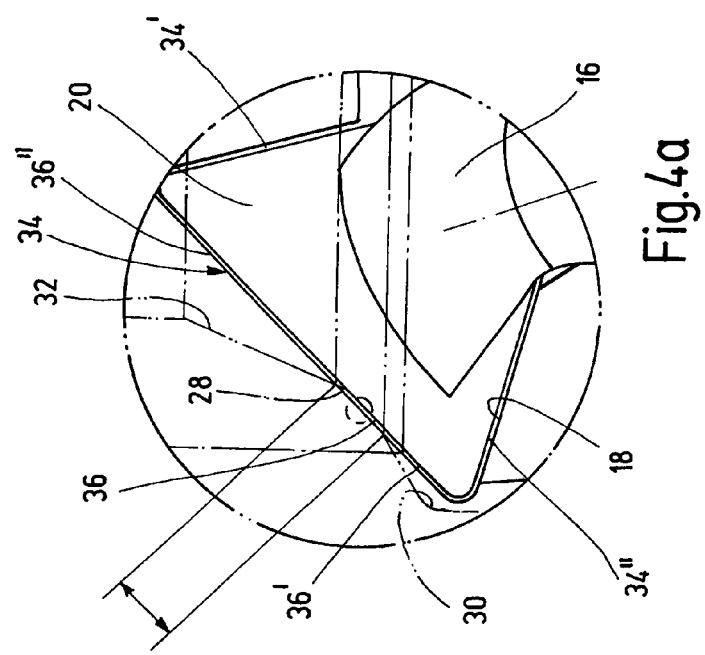
Figure 3C:
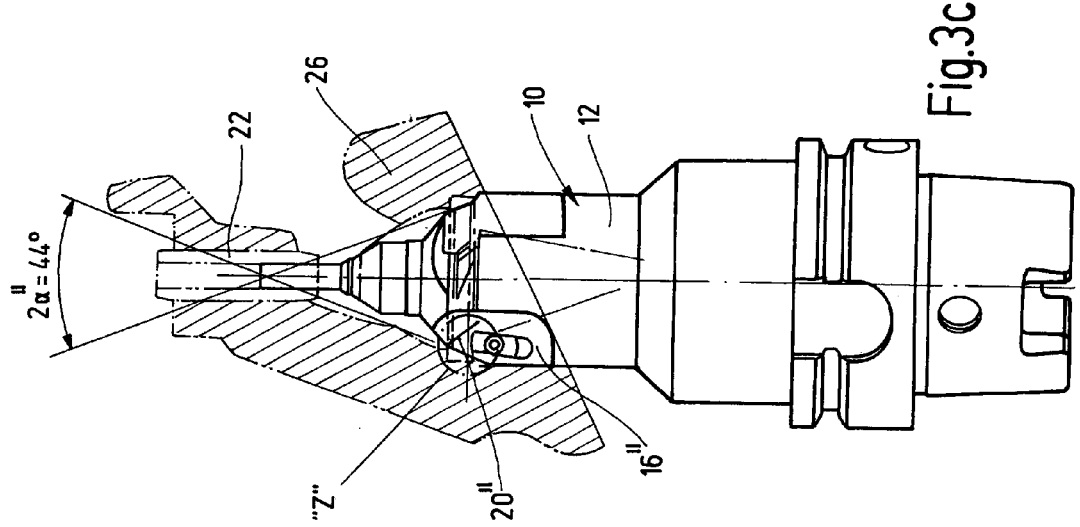
Figure 4C:
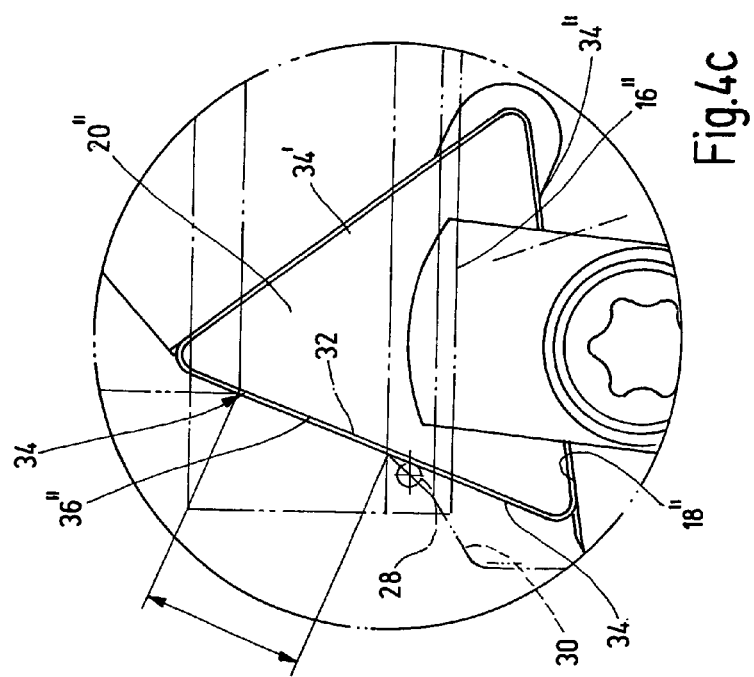

A further feature of the invention is comprised therein, that the active main cutting edge or blade edge 34 in the shown embodiment is subdivided into three non-overlapping segments 36, 36', 36", of which respectively one is associated with an appropriate blade receptacle 18, 18', 18" of one of the short clamp holders 16, 16', 16" (see FIGS. 4a, b and c). Of these, the center cutting segment 36 of the indexable cutting insert 20 located in blade receptacle 18 is for production of the valve seat ring 28 (FIG. 4a). It exhibits the smallest adjustment angle α of the three blades of approximately 22°. The cutting or blade segment 36' in the indexable cutting insert 20' is associated with blade receptacle 18' and is exhibits an adjustment angle α' of 45° for producing the inlet bevel (FIG. 3b, 4b). The cutting or blade segment 36" on the indexable cutting insert 20" in blade receptacle 18" exhibits an adjustment angle α" of 60° for producing the outlet bevel (FIG. 3c, 4c).

By the use of the same type of indexable cutting insert the indexable cutting inserts can in the case of wear also be exchanged between the short clamp holders 16, 16', 16", so that all three blade segments 36, 36', 36" come into employment as the respective main cutting blade or edge 34. Thereby the cutting blade costs attributable to wear are reduced to one third.

Figure 5A:
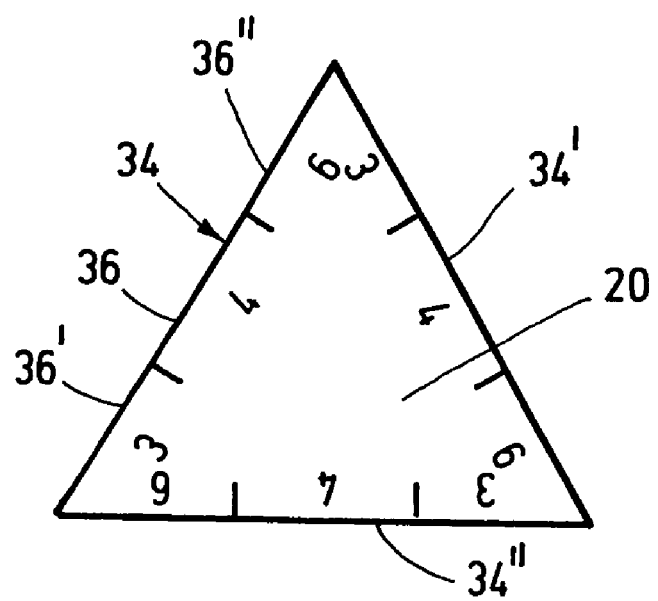
FIGS. 5a and b a top view upon two indexable cutting inserts with triangular and pentagonal circumference and with marked cutting segments.
Figure 5B:
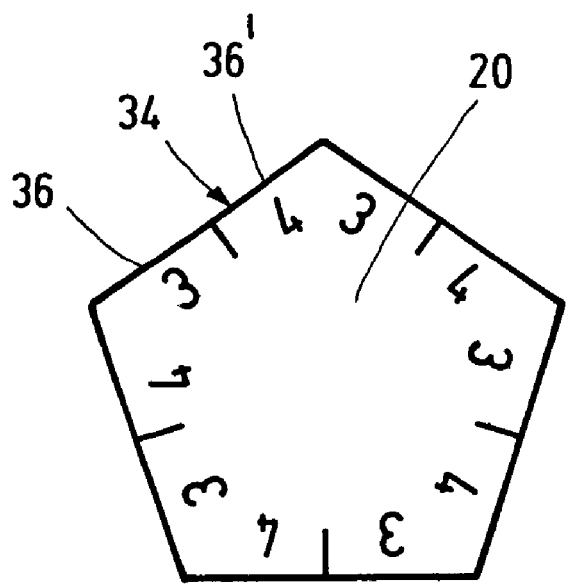

In FIGS. 5a and b top views of two typical indexable cutting inserts 20 with triangular and pentagonal circumference are shown, of which the main cutting edges are subdivided into three or, as the case may be, two cutting blade segments, indicated with reference numbers 3, 4 and 6. The three imprinted numbers indicate for example that the active main edge in the associated blade receptacle exhibits a defined adjustment angle for example 30°, 45° or 60°. The imprint upon the cutting blade simplifies manipulation during resetting. In particular, it can be seen with a single glance which of the characterized cutting edges is already worn and which is not. Thereby inadvertent adjustments can be avoided.

In summary the following can be concluded: The invention concerns a tool head for employment in machine tools with multiple indexable cutting inserts 20, 20', 20". The tool head includes a base body 12, a tool shank 14 projecting axially beyond the base body 12 and at least two blade receptacles 18, 18', 18" which are spaced apart at least in the circumferential direction for receiving respectively one indexable cutting insert. The active main cutting edge of the different indexable cutting inserts thereby have a differing adjustment angle α, α', α" relative to the base body axis. In order to reduce the blade costs, the same type of indexable cutting inserts 20, 20', 20" are provided in the different blade receptacles. Besides this, the active main cutting edges 34 of the indexable cutting inserts are subdivided along their length into at least two blade segments 36, 36', 36" aligned with each other, wherein for the indexable cutting inserts in the various blade receptacles 18, 18', 18" respectively only one of the cutting segments 36, 36', 36" is effective with the associated adjustment angle α, α', α".

The invention claimed is:

1. A tool head for employment in machine tools with
   a base body (12),
   a tool shank (14) projecting axially beyond the base body (12) and adapted for being coupled to a rotating machine spindle, and
   at least two plate receptacles (18, 18', 18") spaced apart in the circumferential direction for receiving respectively one indexable cutting plate (20, 20', 20"), such that a main cutting edge in a cutting position exhibits differing adjustment angles (α, α', α") relative to the base body axis,
   wherein identical indexable cutting plates (20, 20', 20") are provided in the different plate receptacles (18, 18', 18"),
   wherein the active main cutting edges (34) of the indexable cutting plates (20, 20', 20") are subdivided along their length into at least two cutting segments (36, 36', 36") in alignment with each other,
   wherein for each of the various plate receptacles (18, 18', 18") respectively only one of the cutting segments (36, 36', 36") of the indexable cutting plates is effective with the associated adjustment angle (α, α', α"),
   wherein the indexable cutting plates are provided with an imprint in the area of the main cutting edge marking the individual cutting segments, and
   wherein each imprinted cutting segment in the area of the main cutting edge of the indexable cutting plates is associated with one of the plate receptacles.

2. A tool head according to claim 1, wherein the effective cutting segments (36, 36', 36") of the indexable cutting plates (20, 20', 20") exhibit an axial separation from each other in the various plate receptacles (18, 18', 18").

3. A tool head according to claim 1, wherein the indexable cutting plates (20, 20', 20") exhibit at least three main cutting edges (34, 34', 34"), of which in the clamped-in condition respectively only one main cutting edge (34) is active with its effective cutting segment (36, 36', 36").

4. A tool head according to claim 1, wherein the plate receptacles (18, 18', 18") include short clamp holders (16, 16', 16") for the indexable cutting plates (20, 20', 20"), which are rigidly connected with the base body (12).

5. A tool head according to claim 1, wherein in addition a reamer (22) is provided centrally projecting in the direction of advance beyond the area of the indexable cutting plates (20, 20', 20").

6. A tool head according to claim 5, wherein the reamer (22) is displaceable axially relative to the base body (12).

7. A method for relocating identical indexable cutting plates in tool heads according to claim 1, comprising the steps of,
   relocating the identical indexable cutting plates between the various plate receptacles in a cyclic fashion according to a predetermined relocating scheme, wherein the relocating step brings into service the imprinted cutting segments of the active main curling edges assigned to the plate receptacles.

8. A tool head for employment in machine tools with
   a base body (12) having an axis,
   a tool shank (14) projecting axially beyond the base body (12) and adapted for being coupled to a rotating machine spindle, and
   at least two plate receptacles (18, 18', 18") spaced apart in the circumferential direction, each plate receptacle for receiving respectively one indexable cutting plate (20, 20', 20"), each plate receptacle oriented such that once an indexable cutting plate is provided into the plate receptacle a main cutting edge in a curling position exhibits differing adjustment angles ($\alpha$, $\alpha'$, $\alpha''$) relative to the base body axis, wherein identical indexable cutting plates (20, 20', 20") are provided in the different plate receptacles (18, 18', 18") and each indexable cutting plate comprises at least three main cutting edges (34, 34', 34"), wherein the main cutting edges (34) of the indexable cutting plates (20, 20', 20") are subdivided along their length into at least two non-overlapping cutting segments (36, 36', 36") in alignment with each other, wherein for each of the various plate receptacles (18, 18', 18") respectively only one of the non-overlapping cutting segments (36, 36', 36") of each main cutting edge is effective with the adjustment angle ($\alpha$, $\alpha'$, $\alpha''$) associated with each plate receptacle, wherein a different non-overlapping cutting segment is effective with each of the various plate receptacles.

9. A tool head according to claim 8, wherein there are at least three plate receptacles.

10. A tool head according to claim 8, wherein each indexable cutting plate comprises at least five main cutting edges.

11. A tool head according to claim 8, wherein the at least two plate receptacles are oriented to produce at least two different surface features in a material being machined, wherein each of the at least two different surface features is produced with a different non-overlapping cutting segment.

12. A tool head according to claim 8, wherein there are three plate receptacles, each having a different adjustment angle associated therewith, wherein a first plate receptacle is oriented for milling a valve seal ring, a second plate receptacle is oriented for milling an inlet protection bevel, and a third plate receptacle is oriented for machining an outlet protection bevel.

* * * * *